Patented June 30, 1931

1,812,790

UNITED STATES PATENT OFFICE

OSCAR JAECK, DECEASED, LATE OF REINACH, NEAR BASEL, BY WOLFGANG JAECK, ADMINISTRATOR, OF BASEL, AND FRITZ SCHÜTZ, OF BASEL, SWITZERLAND, ASSIGNORS TO THE FIRM OF SOCIETY OF CHEMICAL INDUSTRY IN BASLE, OF BASEL, SWITZERLAND

CELLULOSIC MATERIAL AND PROCESS OF MAKING THE SAME

No Drawing. Application filed June 27, 1929, Serial No. 374,267, and in Switzerland July 13, 1928.

The present invention relates to a new cellulosic material that is immune to the so-called direct dyeing dyestuffs and is characterized by a remarkable affinity for basic dyestuffs. It comprises the new cellulosic material and the process of making the same.

It has been found that the cellulose fibre may be converted into a new cellulosic material by treating it with maleic anhydride whereby combination with maleic acid residues occurs probably in the form of an esterification of OH-groups by maleic acid residues.

In contrast with the anhydrides of organic acids hitherto used for immunizing cellulose, maleic anhydride does not need the addition of a catalyst, a fact which constitutes an important advance in respect of the preservation of the cellulose complex. Moreover, the esterification proceeds comparatively quickly and the treated cellulose acquires, as stated, in addition to immunity, a strong affinity for basic dyestuffs. By treating the new cellulose derivative with a saponifying agent it splits off maleic acid.

The treatment with the maleic anhydride may be conducted with or without the aid of solvents or diluents, and the cellulose to be treated may be used in the form of threads, but also in any other stage of its working-up, if desired also in the already dyed condition.

The following examples illustrate the invention:—

Example 1

1 kilo of cotton yarn, purified in the usual manner, is immersed in 10 kilos of fused maleic anhydride at 50–95° C. In the course of half an hour it is finished, in that it has acquired a high degree of immunity. The cotton may be removed at once from the bath or somewhat later, and is then centrifuged or squeezed and rinsed with warm water. The yarn thus treated can scarcely be dyed at all by means of substantive dyestuffs. On the other hand, it is very strongly dyed by basic dyestuffs.

Similar effects are also obtained by working in the presence of a suitable catalyst, such as small quantities of sulfuric acid, ammonium sulfate, etc.

Example 2

Into a solution of 1.2–1.5 kilo of maleic acid anhydride in 9 kilos of glacial acetic acid, 1 kilo of cotton, purified as usual, is introduced and allowed to remain therein for about 4 hours. The goods are then removed and freed in usual manner from excess of the acylating agent. The result of the process is similar to that of the treatment described in Example 1.

What we claim is:—

1. The process of making new cellulosic materials being immune to direct dyeing dyestuffs and having a strong affinity for basic dyestuffs, wherein the cellulose is treated with maleic anhydride.

2. The process of making new cellulosic materials being immune to direct dyeing dyestuffs and having a strong affinity for basic dyestuffs, wherein the cellulose is treated with maleic anhydride in the presence of a diluent.

3. The process of making threads of a new cellulosic material which is immune to direct dyeing dyestuffs and which has a strong affinity for basic dyestuffs, consisting in treating cellulose threads with maleic anhydride.

4. The process of making threads of a new cellulosic material which is immune to direct dyeing dyestuffs and which has a strong affinity for basic dyestuffs, consisting in treating cellulose threads with maleic anhydride in presence of a diluent.

5. As a new article of manufacture the new cellulosic material containing maleic acid residues, which material is immune to substantive dyestuffs, and has a strong affinity for basic dyestuffs.

6. As a new article of manufacture the new threads of cellulosic material containing maleic acid residues, which new threads are immune to substantive dyestuffs, and have a strong affinity for basic dyestuffs.

In witness whereof we have hereunto signed our names this 15th day of June 1929.

WOLFGANG JAECK,
*Administrator of the Estate of Oscar Jaeck, Deceased.*

FRITZ SCHÜTZ.